United States Patent
Del Ciello

[11] 3,956,669
[45] May 11, 1976

[54] STANDBY POWER SUPPLY

[75] Inventor: Robert R. Del Ciello, Elmwood Park, Ill.

[73] Assignee: Quasar Electronics Corporation, Franklin Park, Ill.

[22] Filed: Oct. 29, 1974

[21] Appl. No.: 518,453

[52] U.S. Cl. .............................. 315/411; 315/101; 315/105; 178/DIG. 11; 328/270
[51] Int. Cl.$^2$ ........................................ H01J 29/70
[58] Field of Search ............. 315/94, 101, 105, 406, 315/411; 358/74; 178/7.3 R, 7.5 R, DIG. 11; 328/260, 270

[56] References Cited
UNITED STATES PATENTS

| | | | |
|---|---|---|---|
| 3,467,882 | 9/1969 | Young | 315/408 |
| 3,496,446 | 2/1970 | Griffey | 315/101 |
| 3,514,532 | 5/1970 | Ludlam | 315/101 |
| 3,783,335 | 1/1974 | Gries | 315/411 |

Primary Examiner—Maynard R. Wilbur
Assistant Examiner—T. M. Blum
Attorney, Agent, or Firm—LaValle D. Ptak

[57] ABSTRACT

A television receiver includes a switched-mode power supply driven by the horizontal oscillator and driver section of the television receiver. An on/off switch for the receiver is connected to the switched-mode power supply to vary its output according to the setting of the on/off switch. This output, when the switch is "on", is used to supply full operating potential to the cathode ray tube filaments and operating potential for some of the portions of the television receiver. When the on/off switch is in its "off" position, it operates to cause the power supply to supply reduced or standby potentials to those same portions of the receiver and to the cathode ray tube filaments. At the same time, other portions of the receiver are turned off and on in the normal fashion.

14 Claims, 2 Drawing Figures

STANDBY POWER SUPPLY

BACKGROUND OF THE INVENTION

In the operation of television receivers, it is often desirable to provide some standby operating power to portions of the receiver even when the receiver is turned "off". This is particularly advantageous for permitting what has become known as "instant-on" operation of a receiver. For such a receiver when the main on/off switch is turned on, the cathode ray tube produces a picture almost instantaneously compared to the relatively long warm up time for the cathode ray tube of receivers without such "instant-on" provisions. With the advent of solid state components in the rest of the receiver, this becomes even more noticeable since the sound generally is available instantly even though some several seconds take place before the cathode ray tube produces a picture.

Integrated circuits also are being used in greater numbers in television receivers. It has been found that the operating life of such integrated circuits can be extended if they are not subjected to the extreme temperature cycling caused by turning them completely off and then turning them back on again when the operation of the receiver is desired. If a lowered standby voltage is supplied to the integrated circuits, they can be maintained in a standby operative state but at a much lower voltage level than when the receiver is in its normal "on" state of operation. This prevents the wide temperature cycling of the integrated circuits which otherwise takes place when they are turned completely off for periods of non-use of the receiver. Temperature cycling has been found to be a major cause of failure of integrated circuits; so that the application of standby power to these circuits at all times, even when the receiver is not being used or is off, is desirable.

It is not necessary, however, to provide standby operating potential to all portions of a television receiver when it is not being used but only for certain portions which include integrated circuits for processing signals and for providing filament voltage to the cathode ray tube to permit an "instant on" operation for the receiver. As a result, it is desirable to employ an on/off switching arrangement in the receiver which operates on portions of the receiver to supply a reduced standby potential to those portions while at the same time turning off other portions of the receiver in the conventional manner.

SUMMARY OF THE INVENTION

It is an object of this invention to provide an improved power supply system for a television receiver.

It is another object of this invention to provide an improved switched mode power supply for a television receiver.

It is a further object of this invention to supply reduced potential to some portions of a receiver when it is in its "off" condition of operation.

It is an additional object of this invention to employ the horizontal driver section of a television receiver for supplying filament power and other operating potential for the television receiver when it is turned on and to continue to supply such power but at a reduced level when the receiver is turned off.

In accordance with a preferred embodiment of this invention, a system for providing reduced power to portions of a television receiver when the receiver is turned off or is in a state of non-use operates in conjunction with the horizontal driver section of the receiver. The horizontal oscillator circuit portion of the receiver is supplied with operating potential at all times whether the receiver is turned on or off. The oscillator circuit supplies substantially squarewave output signals to a driver switch to operate the driver switch between states of conduction and non-conduction in response to alternate half cycles of the output signal from the oscillator.

The driver switch is connected in series with the primary winding of a power supply transformer in the switched mode power supply. The transformer has at least one secondary winding coupled with a portion of the television receiver which is to be supplied with reduced standby power. An on/off switch circuit is coupled between a source of direct current operating potential and the primary winding of the transformer in one embodiment. This switch circuit operates to supply a higher potential to the transformer primary winding when the receiver is on and to supply a reduced potential to the primary winding of the transformer when the receiver is off. This results in a change in the output voltage coupled by the transformer to the secondary winding.

In another embodiment, the on/off switch circuit is coupled between the power supply and an oscillator included in a horizontal processor integrated circuit. In this embodiment, the different potentials supplied from the on/off switch circuit in its "on" and "off" states operate to change the duty cycle of the oscillator. This in turn varies the ratio of the on time to the off time of the driver switch to correspondingly alter the output power supplied by the secondary winding of the transformer.

DETAILED DESCRIPTION

Figure 1:
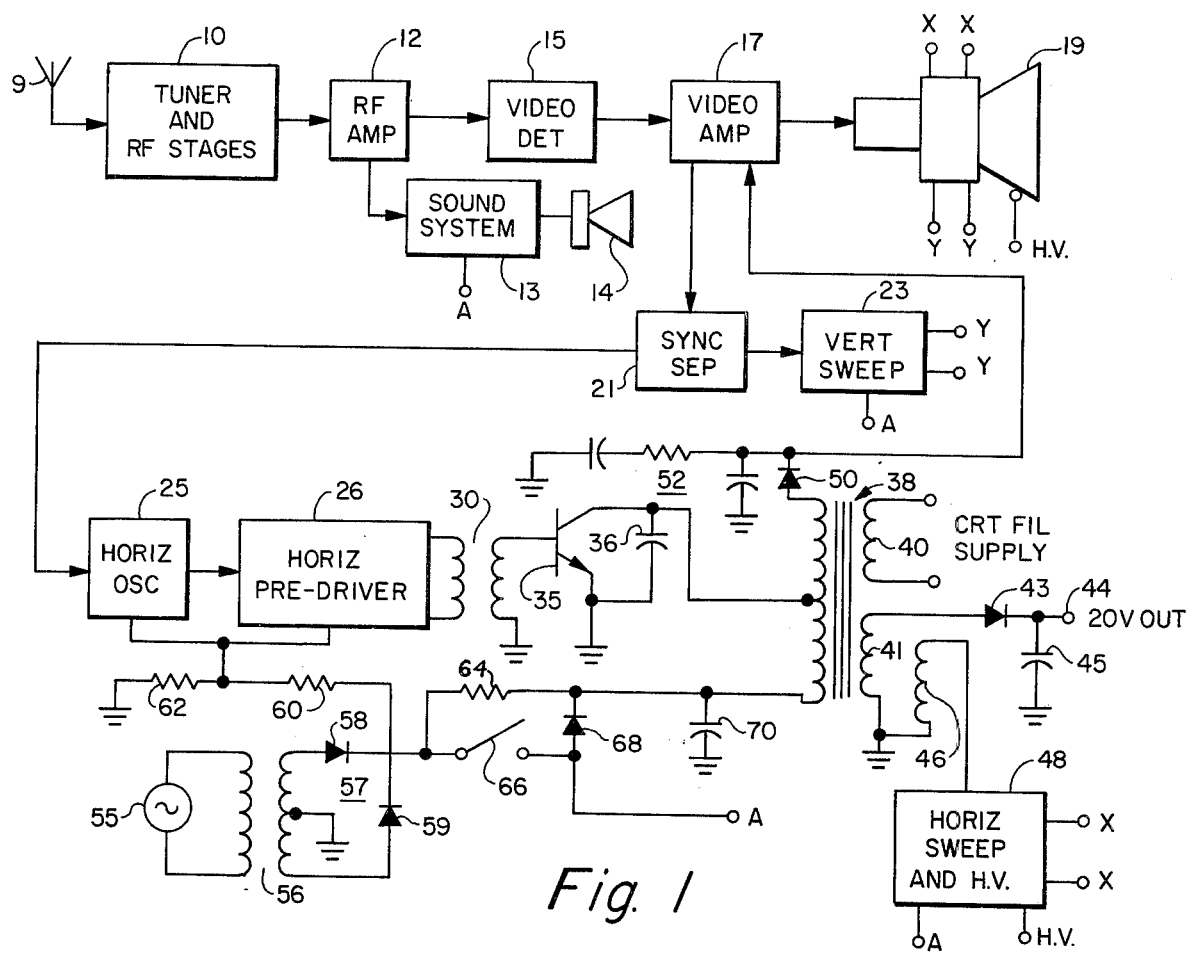
FIG. 1 is a schematic diagram, partially in block form, of a preferred embodiment of the invention.

In the drawings, the same reference numerals are used in both figures to designate the same or similar components.

Referring now to FIG. 1, there is shown a block diagram of a television receiver, which may be either a color television receiver or a black and white television receiver. The particular type of receiver is unimportant to an understanding of the present invention which can be used with either type.

Incoming signals are received on an antenna 9 and are applied to the conventional tuner and RF processing stages 10. From the tuner and RF stages 10 the IF signals are applied to an IF amplifier stage 12, which in turn supplies the IF signals to a conventional sound system 13 to drive a loudspeaker 14. The IF signals also are supplied to a video detector stage 15 which supplies the detected video signals to a video amplifier 17 coupled to a cathode ray tube 19 which produces the received picture on its screen.

A sync separator circuit 21 is coupled to the video amplifier circuit 17 and supplies separated vertical and horizontal synchronizing pulses. The vertical synchronizing pulses are used to control operation of a vertical sweep circuit 23 of conventional type which produces the vertical deflection signals on a pair of terminals YY for the cathode ray tube 19. Similarly, the horizontal synchronizing pulses of the composite television signal are supplied from the sync separator circuit 21 to a synchronizing input of a horizontal oscillator 25. The oscillator 25 may be of any suitable type and produces squarewave output signals at the horizontal frequency of the television receiver. These signals then are shaped and amplified by a horizontal pre-driver circuit 26.

The output of the horizontal pre-driver circuit 26 is applied to the primary winding of a coupling transformer 30, the secondary winding of which is connected between ground and the base of an NPN driver transistor 35. The transistor 35 is driven on and off on alternate half cycles of the signals produced by the horizontal oscillator 25. A capacitor 36 is connected across the collector-emitter electrodes of the transistor 35, and the collector also is connected to the primary winding of a switched mode power supply output transformer 38.

One secondary winding 40 of the transformer 38 supplies the cathode ray tube filament voltages to the filaments of the cathode ray tube 19. In addition, a secondary winding 41 is coupled through a half-wave rectifier 43 to a 20-volt DC output terminal 44. A filter capacitor 45 removes ripple components from the voltage applied to the terminal 44. The voltage appearing on the terminal 44 is used to supply operating potential to integrated circuit components used in other portions of the television receiver, but the connections to these other portions are not shown since they will vary from receiver to receiver depending on its design.

The horizontal output signals also are coupled from a secondary winding 46 to the input of the horizontal sweep and high voltage circuit 48, which includes the conventional horizontal sweep circuitry and flyback transformer for producing the horizontal deflection voltages on a pair of terminals XX for the cathode ray tube 19. This circuitry also supplies the high voltage for the cathode ray tube 19 in a conventional manner.

Approximately 200-volts DC operating voltage also is obtained from a half-wave rectifier 50 and applied as the operating voltage for the video amplifier circuit 17. This voltage is filtered by a resistance-capacitance circuit 52 to remove ripple components.

Operating potential for the entire television receiver is obtained from a suitable source of alternating current line voltage indicated at 55. This can be the conventional household line current. The alternating current voltage is applied through a coupling transformer 56 to a full-wave rectifier circuit 57, illustrated as including a pair of diodes 58 and 59 operating in conjunction with the grounded center tap of the secondary winding of the transformer 56. The voltage produced at the junction of the cathodes of the diodes 58 and 59 is applied through a resistive voltage divider including a pair of resistors 60 and 62 to supply an operating potential at all times to the horizontal oscillator 25 and the horizontal pre-driver circuit 26.

The junction terminal of the cathodes of the diodes 58 and 59 also is coupled through an on/off switching circuit including a relatively large value resistor 64 connected in parallel with a shunting switch 66 and an isolating diode 68 to the primary winding of the transformer 38 to supply operating potential to the primary winding and to the switching transistor 35. The junction of the anode of the diode 68 and the switch 66 further is used to supply voltage to a terminal A.

When the switch 66 is closed, the television receiver is turned "on" and placed in its normal operative condition. The voltage supplied to the primary winding of the transformer 38 then is practically the entire potential available at the junction of the diodes 58 and 59. It is reduced only by the small forward voltage drop across the junction of the isolating diode 68. A capacitor 70 is used to filter this voltage and remove ripple components. The circuit then operates to supply the desired normal cathode ray tube filament voltage to the filaments of the cathode ray tube 90 from the secondary winding 40. In addition, the voltage applied to the video amplifier 17 through the half-wave rectifier diode 50 is the maximum full voltage required to operate the amplifier 17. Similarly, the voltage applied to the terminal 44 through the rectifier 43 is the desired maximum level of voltage.

At the same time, closure of the switch 66 applies the full voltage available from the rectifier 57 to the terminal A. This terminal is connected to supply the operating voltages for the vertical sweep and horizontal sweep systems 23 and 48 and also to supply operating voltage for the sound system 13. Within these different portions of the receiver supplied by the voltage on terminal A, voltage dividers may be used to adjust the voltage to the desired levels.

When the switch 66 is opened to turn off the receiver, no further potential is applied to the terminal A; so that the sound system 13, vertical sweep system 23, and horizontal sweep system 48 are not supplied with operating potential. As a consequence, the television receiver essentially is turned off. At the same time, however, full operating potential continues to be applied to the horizontal oscillator 25 and horizontal pre-driver circuit 26 through the voltage dividers 60 and 62. The horizontal oscillator continues to operate as a free-running oscillator since it no longer is supplied with synchronizing signals from the sync separator circuit 21. This is of no consequence, however, for this phase of operation of the receiver. Operating potential for the switched mode power supply transformer 38 and switching transistor 35 now is supplied through the large value resistor 64, which reduces this voltage to a much lower level than that previously applied through switch 66. The blocking diode 68 prevents this voltage from being applied to the terminal A.

Since the horizontal oscillator 25 continues to operate and since there is voltage available for the collector of the switching transistor 35 through the primary winding of the transformer 38, the horizontal driver portion of the circuit including the oscillator 25 and the components coupled from the oscillator 25 to the primary winding of the transformer 38 continues to operate as before. Because the voltage applied to the primary winding of the transformer 38, however, is much lower, the voltage appearing on the secondary winding 40 for the cathode ray tube filament supply also is reduced to a lower standby level. Similarly, the voltage appearing on the output terminal 44 is lower as is the voltage applied through the half-wave rectifier 50 to the video amplifier circuit 17. This constitutes the standby condition of operation of the circuit.

The reduced voltage supplied to the cathode ray tube filaments from the secondary winding 40 is sufficient to keep the filaments warm; so that when the on/off switch 66 subsequently is closed to turn on the receiver, the increased filament supply rapidly brings the filaments up to operating temperature resulting in an "instant-on" operation of the cathode ray tube 19.

The standby power which is supplied to the terminal 44 and supplied from the rectifier 50 to the video amplifier 17 when the on/off switch 66 is in its "off" position is sufficient to maintain a reduced operating potential on the integrated circuit components which are used in the different parts of the television receiver. This prevents these parts from being subjected to the wide temperature cycles which would otherwise occur if operating potential was completely turned off or removed from them when the set was turned off.

Figure 2:
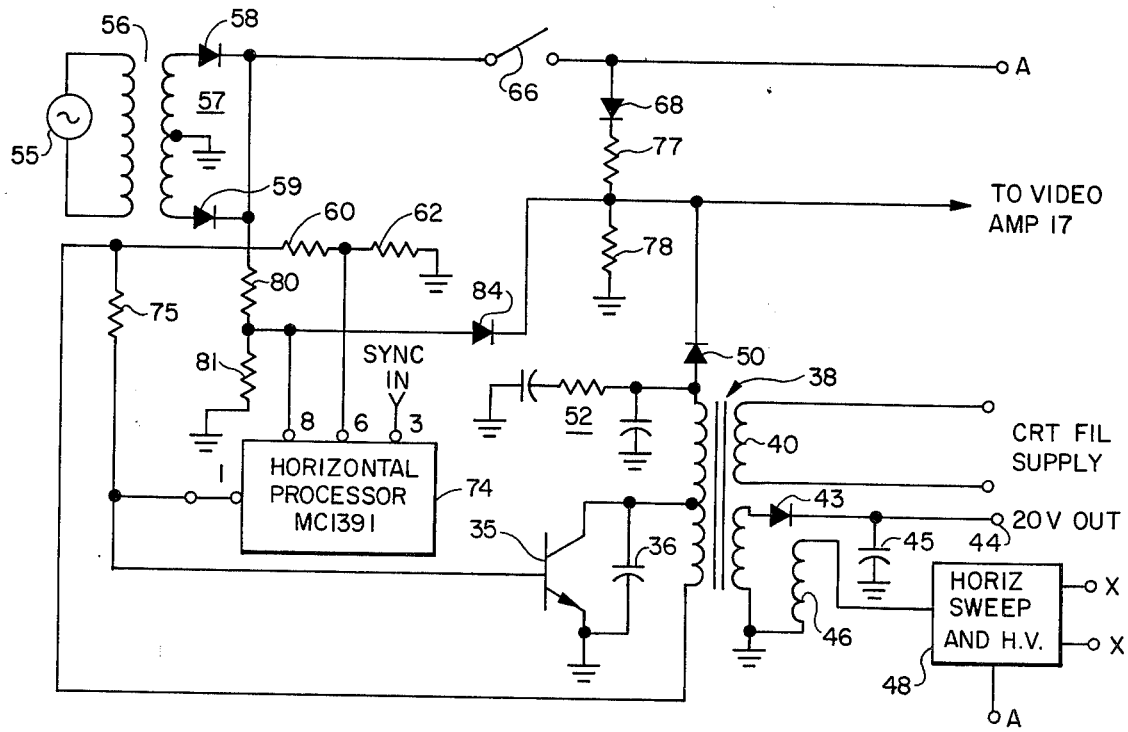
FIG. 2 is a schematic diagram of another embodiment of the invention which can be substituted for a portion of the circuit shown in FIG. 1.

FIG. 2 illustrates a variation of a portion of the circuit shown in FIG. 1, where the horizontal oscillator 25 and horizontal pre-driver 26 have been replaced with an integrated circuit horizontal processor 74. This processor circuit includes a horizontal oscillator section and horizontal pre-driver section as part of the integrated circuit package. Different horizontal processor circuits are commercially available, and one which has been found suitable for operation in the circuit of FIG. 2 is manufactured by Motorola, Inc. and is identified as the MC1391 television horizontal processor. The circuitry of that processor is incorporated herein by reference. The processor 74 is continuously supplied with operating potential on pin 6 from the voltage divider comprising the transistors 60 and 62. Reference to the different pins of the horizontal processor 74 are the same as the pins designated in the data sheet for the MC1391 horizontal processor. Similarly, operating potential for the output stage of the horizontal processor 74 is applied through a load resistor 75 to pin 1, which constitutes the output terminal coupled to the collector of an NPN output amplifier transistor.

When the on/off shunt switch 66 is closed to its "on" position, applying operating potential to the terminal A, potential also is applied through the blocking diode 68 and a pair of relatively high value resistors 77 and 78 connected as a voltage divider across the output. A second voltage divider comprised of a pair of resistors 80 and 81 is connected between ground and the junction of the diodes 58 and 59. This voltage divider 80, 81 is supplied with potential from the rectifier 57 irrespective of the position of operation of the switch 66.

The output taps on the voltage dividers 77, 78 and 80, 81 are interconnected through an isolating diode 84. The relative values of the resistors in each of the voltage dividers are such that when the switch 66 is closed, the diode 84 is reverse-biased. As a consequence, the voltage supplied to the pin 8 of the horizontal processor circuit 74 is determined exclusively by the voltage divider resistors 80 and 81 when the receiver is turned "on". This voltage causes the duty cycle of the oscillator in the horizontal processor 74 to be such that the transistor 35 is rendered conductive for a sufficient proportion of each cycle of operation of the output signal from the horizontal processor 74 to cause the maximum or normal operating potentials to be applied to each of the secondary windings of the transformer 38, as described previously in conjunction with FIG. 1.

In FIG. 2 operating potential for the primary winding of the transformer 38 is obtained by connecting the winding directly to the junction of the cathodes of the diodes 58 and 59; so that this potential is available irrespective of the condition of operation of the switch 66.

When the switch 66 is opened to turn "off" the receiver in the manner described previously in conjunction with FIG. 1, the diode 84 no longer is back-biased but operates to couple the resistor 78 in parallel with the resistor 81 in the voltage divider network coupled to the pin 8 of the horizontal processor. The change in potential which occurs on pin 8 of the processor 74 then causes the duty cycle of the oscillator in the processor to be changed to reduce the on time of the output driver switch transistor 35. This in turn reduces the build-up in the primary winding of the transformer 38 for each cycle of operation and results in a reduced output from each of the secondary windings of the transformer 38 in a manner similar to that described above in conjunction with FIG. 1. This reduced output constitutes the standby power or standby mode of operation of the circuit of FIG. 2 and is the same as described previously.

In summary, the reduced standby power from the switched mode power supply transformer can be obtained by reducing the voltage applied to the primary winding of the transformer during the standby mode of operation from that which is applied to it during the "on" condition of operation of the receiver. Or the standby power can be obtained by changing the duty cycle of the driver switch transistor 35 while continuing to apply the same operating potential to the primary winding of the transformer 38. In either case the net result of operation is the same, causing a reduced output voltage to be obtained from the secondary windings of the transformer 38 for the standby mode of operation.

I claim:
1. In a wave signal receiver having a plurality of different sections for providing different circuit functions including at least one section for supplying power to other sections of said receiver, a system for providing reduced standby power to such other sections of said receiver when said receiver is turned off including in combination:

oscillator circuit means in said one section for producing a substantially squarewave output signal at a predetermined frequency;

driver switch means having an input coupled with the output of said oscillator circuit means for switching between first and second states in response to alternate half cycles of said oscillator circuit means output signals;

transformer means having a primary winding and at least one secondary winding;

means coupling the output of said driver switch means with the primary winding of said transformer means for controlling the current flow therethrough in response to operation of said driver switch means between said first and second states of operation;

means for supplying direct current operating potential; and an on/off switching circuit comprising a first resistor coupled between said means for supplying direct current operating potential and at least one of said oscillator circuit means and the primary winding of said transformer means, and a shunting switch means coupled in parallel with said first resistor, so that closure of said shunting switch means effectively places said on/off switching circuit in its "on" state and operates to shunt said resistor, causing a first predetermined operating potential to be supplied thereby with said shunting switch means closed and for causing a second lower predetermined operating potential to be supplied thereby with said shunting switch means being open.

2. The combination according to claim 1 further including an isolating diode means coupled between said shunting switch means and the junction of said resistor with one of the primary winding of said transformer means and said oscillator circuit means, said diode means being poled to permit DC current flow from said means for supplying direct current operating potential through said shunting switch means when said shunting switch means is closed, the junction of said shunting switch means and said isolating diode means further being coupled to a direct current voltage supply terminal for at least one of said other sections of said receiver, said diode blocking the application of direct current potential to said direct current voltage supply terminal when said shunting switch means is open.

3. In a television receiver having a horizontal driver section for supplying signals for operating horizontal sweep and high voltage circuitry and for supplying power to other portions of said receiver, a system for providing reduced standby power to such other portions of said receiver when said receiver is turned off including in combination:
oscillator circuit means for producing a substantially squarewave output signal at a predetermined frequency;
driver switch means having an input coupled with the output of said oscillator circuit means for switching between first and second states in response to alternate half cycles of said oscillator circuit means output signal;
horizontal output transformer means having a primary winding and at least one secondary winding;
means coupling the output of said driver switch means with the primary winding of said transformer means for controlling the current flow therethrough in response to operation of said driver switch means between said first and second states of operation;
means for supplying direct current operating potential; and
on/off switching circuit means comprising a first resistor coupled in series between said means for supplying direct current operating potential and the primary winding of said transformer means, and a shunting switch means coupled in parallel with said first resistor, so that closure of said shunting switch means effectively places said on/off switching circuit means in its "on" state and operates to shunt said resistor to cause a higher potential to be supplied to the primary winding of said transformer means when said shunting switch means is closed than when said shunting switch means is open, thereby causing the potential in the secondary winding of said transformer means to vary accordingly.

4. The combination according to claim 3 further including means for supplying operating potential to said oscillator means irrespective of the condition of operation of said on/off switching circuit means.

5. The combination according to claim 3 further including an isolating diode means coupled between said shunting switch means and the junction of said resistor with the primary winding of said transformer means, said diode means being poled to permit DC current flow from said means for supplying direct current operating potential through said shunting switch means to the primary winding of said transformer means when said shunting switch means is closed, the junction of said shunting switch means and said isolating diode means further being coupled to a direct current voltage supply terminal for a portion of said receiver, said diode blocking the application of direct current potential to said direct current voltage supply terminal when said shunting switch means is open.

6. The combination according to claim 3 wherein said oscillator circuit means comprises the horizontal oscillator circuit for said television receiver; said driver switch means is coupled in series with the primary winding of said transformer means; said first and second states of operation of said driver switch means comprise states of conduction and non-conduction, respectively; and said on/off switching circuit means is coupled in series circuit with the primary winding of said transformer means and said driver switch means for changing the voltage applied to the primary winding of said transformer means in accordance with the state of operation of said on/off switch means.

7. The combination according to claim 6 wherein said driver switch means comprises a driver transistor, the emitter-collector path of which is connected in series circuit between one terminal of said means for supplying direct current operating potential and one end of the primary winding of said transformer means; and said on/off switching circuit means comprises a first resistor connected between the other end of the primary winding of said transformer means and the other terminal of said means for supplying direct current operating potential, and a shunting switch means having a first terminal coupled to the junction of said first resistor with said other terminal of said means for supplying direct current operating potential and having a second terminal coupled through an isolating diode to the junction of said first resistor with said other end of the primary winding of said transformer means to cause a higher voltage to be applied to said transformer means when said shunting switch means is closed than is applied to the primary winding of said transformer means when said shunting switch means is open.

8. The combination according to claim 7 further including means for supplying operating potential to said horizontal oscillator circuit irrespective of the state of operation of said shunting switch means, and further including means coupled with the second terminal of said shunting switch means for supplying operating potential to some portions of said TV receiver only when said shunting switch means is closed, said isolating diode means preventing the application of operating potential to such portions when said shunting switch means is open.

9. The combination according to claim 8 wherein said transformer means includes a secondary winding for providing potential to the filaments of the cathode ray tube of said television receiver and further includes secondary windings for supplying operating potential to other portions of said TV receiver, said filament potential and such operating potential being of reduced value when said shunting switch means is open and being of greater value when said shunting switch means is closed.

10. In a television receiver having a horizontal processor for supplying signals for operating horizontal sweep and high voltage circuitry and for supplying power to other portions of said receiver, a system for providing reduced standby power to such other portions of said receiver when said receiver is turned off including in combination:

horizontal oscillator circuit means in said horizontal processor for producing a substantially squarewave output signal at a predetermined frequency;

driver switch means having an input coupled with the output of said oscillator circuit means in said horizontal processor for switching between first and second states in response to alternate half cycles of said oscillator circuit means output signals;

transformer means having a primary winding and at least one secondary winding;

means coupling said driver switch means with the primary winding of said transformer means for controlling the current flow therethrough in response to operation of said driver switch means;

means for supplying direct current operating potential for at least said horizontal processor of said television receiver;

a first voltage divider;

on/off switch means having a first terminal coupled to said means for supplying direct current operating potential and having a second terminal coupled through said first voltage divider to a point of reference potential;

a second voltage divider coupled between the first terminal of said on/off switch and a point of reference potential, with a first tap on said second voltage divider coupled with said oscillator circuit means in said horizontal processor for controlling the duty cycle of said oscillator circuit means therein; and isolating diode means coupled between said first tap and a second tap on said first voltage divider means, the potentials present on each of said first and second taps being such that when said on/off switch is "on" said isolating diode means is reverse biased and the potential coupled with said oscillator circuit means is determined solely by the potential across said second voltage divider; and when said on/off switch means is "off" said isolating diode means is forward-biased to thereby change the voltage applied to said oscillator circuit means to change the duty cycle thereof.

11. The combination according to claim 10 wherein said driver switch means is switched between states of conduction and non-conduction on alternate half cycles of the output signal from said oscillator circuit means in said horizontal processor, and whereby the duty cycle of said oscillator output signal is varied to cause the potential obtained from the secondary winding of said transformer means to be reduced when said on/off switch means is "off" from the potential obtained from such winding when said on/off switch means is "on".

12. The combination according to claim 11 further including an additional output terminal coupled with the second terminal of said on/off switch means for supplying operating potential to some portions of said television receiver when said on/off switch means is "on" and for terminating supply of operating potential to such portions of said receiver when said on/off switch means is "off".

13. The combination according to claim 12 wherein said transformer means has at least one secondary winding coupled with rectifier circuit means for supplying operating potential to other portions of said television receiver, said operating potential being at a first predetermined level when said on/off switch means is "on" and being at a lower predetermined level when said on/off switch means is "off".

14. The combination according to claim 12 wherein said transformer means has at least one secondary winding coupled with the filaments of said cathode ray tube for supplying filament voltage at a first predetermined level when said on/off switch means is "on" and for supplying filament voltage at a lower level when said on/off switch means is "off".

* * * * *